United States Patent [19]

Ban

[11] Patent Number: 4,460,933
[45] Date of Patent: Jul. 17, 1984

[54] MODE CHANGEOVER APPARATUS FOR MAGNETIC RECORDER/PLAYER

[76] Inventor: Itsuki Ban, 3-50-18, Higashi Oizumi, Nerima-ku, Tokyo, Japan

[21] Appl. No.: 294,635

[22] Filed: Aug. 20, 1981

[30] Foreign Application Priority Data

Sep. 5, 1980 [JP] Japan .................................. 55-122426

[51] Int. Cl.³ .............................................. G11B 15/10
[52] U.S. Cl. ..................................... 360/106; 360/96.4
[58] Field of Search ............... 360/104, 105, 106, 137, 360/69, 96.3, 96.4, 96.5, 96.6

[56] References Cited

U.S. PATENT DOCUMENTS 3,609,844 10/1971 Ichikawa ............................ 360/96.6
3,747,941 7/1973 van der Lely ..................... 360/96.5
3,834,651 9/1974 Hashizume et al. ............... 360/96.4
4,031,556 6/1977 Ban et al. ............................ 360/96.4

Primary Examiner—Joseph A. Popek
Attorney, Agent, or Firm—Kenway & Jenney

[57] ABSTRACT

The disclosed mode changeover apparatus for a magnetic recorder/player features motor-assisted movement of a magnetic head-carrying support base relative to a deck between playback, cue and review and stop positions. The support base is biased toward the stop position and is moved to a playback position responsive to rotation of the motor in a first direction and to the cue and review position responsive to rotation of the motor in the opposite direction.

12 Claims, 13 Drawing Figures

FIG. 7b

MODE CHANGEOVER APPARATUS FOR MAGNETIC RECORDER/PLAYER

BACKGROUND OF THE INVENTION

The present invention relates to a magnetic recorder/player, and more particularly to a mode changeover apparatus for a magnetic recorder/player.

Mechanical selection mechanisms for effecting changeover between modes such as playback, cue, review and stop in magnetic recorder/player are generally known in the prior art. The prior art selection mechanisms include push-buttons which require a large amount of force for operation and must move through large strokes before they are fully depressed. To eliminate such difficulties, provision of a plurality of solenoid operated plungers has been proposed which however suffers from the following disadvantages:

Since the plungers operate in about 1/100 second, the operating current will have a large peak value which burdens the power supply. The plungers are also disadvantageous in that they produce strong impact sounds.

When a take-up reel is driven by a motor in a reproduction mode, there is a tendency for flutters in sounds reproduced to increase due to ripples in the torque of the motor and ripples in the torque of a power transmission system including gears. It has been known to incorporate means for allowing smooth movement between the motor and the take-up reel for the reduction of flutters. With such means, however, the take-up reel is liable to slip on the motor shaft in a fast feed mode.

At least two motors, preferably disk-type coreless motors, are necessary for driving a support base or reels. Such disk-type coreless motors are flat in shape, small in size, lightweight, and free from cogging which would result in torque ripples. The disk-type coreless motors are however disadvantages in that they are costly to manufacture on account of the number of manufacturing steps required for fabricating flat coreless armatures.

SUMMARY OF THE INVENTION

The above-described drawbacks in the prior art apparatus have been successfully eliminated by the present invention.

A primary object of the present invention is to provide a mode changeover apparatus for a magnetic recorder/player in which a single small-sized D.C. motor has three modes of operation, that is, regular rotation, reverse rotation and stop which are associated with movement of a support base to select modes of playback, cue, review and stop, so that mode changeover can be effected with a simple mechanism by actuating an electric switch, and generation of impact sounds can completely be suppressed with the amount of an input current being reduced.

Another object of the present invention is to provide such a mode changeover apparatus including a simple and inexpensive braking mechanism for braking take-up and supply reels without the use of solenoid-operated plungers.

Still another object of the present invention is to provide such a mode changeover apparatus including a drive motor which is small in size, flat in shape, lightweight, less costly to manufacture, has improved characteristics and volumetric efficiency, the motor comprising an inexpensive armature mass-produced by an expert manufacturer and other parts (bearings, a field magnet and others) purchased separately, which may be assembled into a magnetic recorder/player on an assembly line.

These and other objects of the invention will become apparent from the following description of embodiments thereof when taken together with the drawings.

DETAILED DESCRIPTION OF PREFERRED EMBODIMENTS

Figure 1:
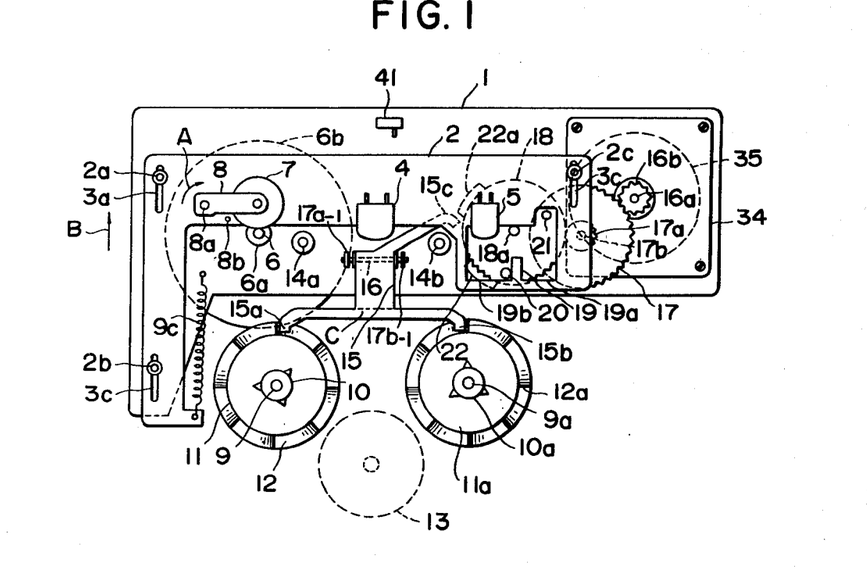
FIG. 1 is a plan view of a mode changeover apparatus for a magnetic recorder/player according to the present invention.

In FIG. 1, a deck 1 of mild steel is secured to the body of a magnetic recorder/player (not shown) and has guide pins 2a, 2b, 2c projecting therefrom. A support base 2 has guide slots 3a, 3b, 3c receiving therein the guide pins 2a, 2b, 2c, respectively, and is supported so as to be movable in the direction of the arrow B or in the opposite direction. The support base 2 is normally biased by a spring 9c in the direction of the arrow B.

The support base 2 supports thereon a magnetic head 4 and an erase head 5, and a pin 8a projecting therefrom and supporting a lever 8 pivotally thereon which is normally biased by a spring (not shown) to turn in the direction of the arrow A. The lever 8 has a pinch roller 7 which presses a magnetic tape (not shown) against a capstan 6 which causes the magnetic tape to travel to the left in FIG. 1. The deck 1 has a bearing 6a for the capstan 6. A flywheel 6b is fixed to the capstan 6 at a lower end thereof and is drivable by a conventional means to rotate in the counterclockwise direction.

A pair of shafts 9, 9a extend from the body of the magnetic recorder/player. A pair of reels 10, 10a are rotatably supported on the shafts 9, 9a, respectively, the reels 10, 10a being integral with a pair of reel bases 11, 11a, respectively. The reels 10, 10a and reel bases 11, 11a are molded of plastic material. The reel bases 11, 11a have peripheral ratchet teeth (each eight in number) 12, 12a, respectively.

The reels 10, 10a may be driven by any known means such as a motor 13 mounted on the body of the magnetic recorder/player and having a power output shaft which, upon regular rotation, rotates the reel 10 counterclockwise and, upon reverse rotation, rotates the reel 10a clockwise for winding the magnetic tape.

A cassette (not shown) is inserted from above and mounted in place by a conventional means. The cassette has hubs which fit over the reels 10, 10a, respectively, and holes which receive guide pins 14a, 14b projecting from the deck 1.

When the parts are in the position shown in FIG. 1, the magnetic tape is fed leftward by the capstan 6 and the associated pinch roller 7 and wound around the one of the hubs of the cassette. Thus, the apparatus is in a playing or recording mode of operation. The reels 10, 10a are called "take-up reel" and "supply reel", respectively.

A lever 15 is pivotably supported on a pivot pin 16 journalled in bearings 17a, 17b mounted on the deck 1, the lever 15 being thus pivotable up and down. The lever 15 has side arms having at ends braking members 15a, 15b which can be lowered into engagement with the ratchet teeth to suddenly brake the reel 10 or 10a. In a rewind mode of operation in which the reel 10 rotaes clockwise, the braking member 15a can engage the ratchet teeth 12 to brake the reel 10. In a fast feed mode of operation in which the reel 10a rotates counterclockwise, the braking member 15b can engage the ratchet teeth 12a to brake the reel 10a. For such a braking action, the lever 15 may be lifted at an end 15c thereof with a small amount of force by a lifter means which will be described later on. While fact ratchet teeth have been shown and described, ordinary ratchet teeth which project radially outwardly can instead be used for the same results.

The lever 15 may be cut off along a broken line to separate the side arms which may be connected by a spring so as to be movable laterally with respect to the body of the lever 15 for absorbing a shock produced upon braking, thus protecting the magnetic tape. The deck 1 has a cylindrical recess 35 (FIGS. 1 and 4a) in which there is received an annular field magnet 36 positioned in place on the bottom of the recess 35 by a bent edge 35a. The recess 35 houses therein a disk-type flat motor. The deck 1 constitutes a yoke for the field magnet 36.

Figure 4A:
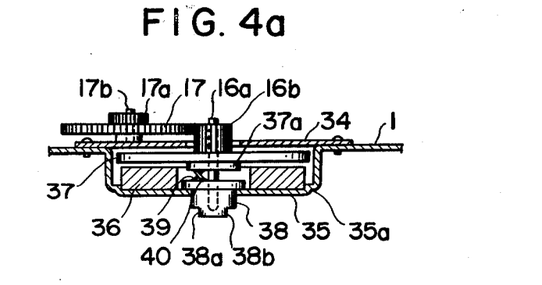
FIGS. 4a through 4c are views illustrative of the motor.
Figure 4B:
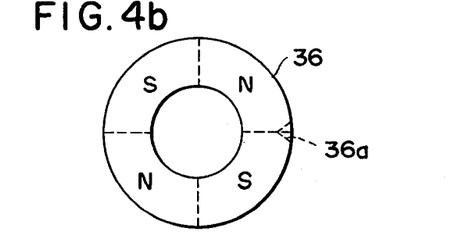

The field magnet 36 is made of ferrite and comprises, as shown in FIG. 4b, north and south poles each shaped in the form of a 90° arc and arranged alternately with each other. The field magnet 36 has a notch 36a formed in a peripheral surface thereof facing the bent edge 35 (FIG. 4a) and serving to locate the magnetic poles of the magnet 36 in place with respect to brushes 39, 40 illustrated in FIG. 4c. More specifically, the notch 36a receives therein a projection (not illustrated) extending from the bottom of the recess 35 to secure the field magnet 36 in position in the recess 35.

Figure 4C:
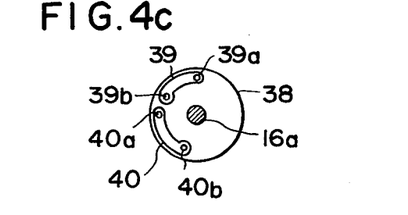

A member 38 (FIG. 4a) molded of plastic material is fitted in a central hole in the bottom of the recess 35 and serves as a support for the brushes 39, 40 and a bearing for rotatably supporting a rotative shaft 16a. As shown in FIG. 4c which is a plan view, the molded member 38 (hereafter referred to as a bearing) supports thereon the brushes 39, 40 having respective ends 39b, 40b secured to the bearing 38 and metal contacts 39a, 40a, respectively, at free ends, the contacts 39a, 40a being angularly spaced 90 degrees from each other and held in frictional contact with a disk-shaped commutator 37a as shown in FIG. 4a. An armature 37 is in the form of a disk molded of plastic material and supports armature coils angularly spaced 90 degrees from each other. A small-sized gear 16b is simultaneously or integrally molded with the armature 37. The armature 37 is caused to rotate when it is supplied with electricity via the brushes 39, 40 from a power supply.

Details of the motor described above are disclosed in Japanese Laid-Open Patent Publication No. 52-36507 by the present inventor.

The armature 37, the rotatable shaft 16a, and the commutator 37a are (integrally) molded and secured to each other. The bearing 38 has in a lower end thereof a pair of recesses 38a, 38b. The bearing 38 may be gripped at the recesses 38a, 38b and angularly moved about its axis to adjust relative angular relationship between the brushes 39, 40 and the magnetic poles of the field magnet 36. Thus, the motor can be corrected for most efficient operation through such adjustment. In practice, the bearing 38 is turned until a minimum no-load current is reached, and then is bonded to the bottom of the recess 35.

A base plate 34 (FIGS. 1 and 4a) made of mild steel is screwed to the deck 1 and serves as a magnetic path for the field magnetic 36. A shaft 17b projects from the base plate 34 and supports thereon gears 17, 17a. The gears 17, 17a are integral with each other, the gear 17 being held in mesh with the gear 16b, which projects upwardly through a central hole in the base plate 34.

A gear 18 (FIG. 1) is rotatably supported on a shaft 18a projecting from the deck 1 and is held in mesh with the gear 17a. When the motor illustrated in FIG. 4 is energized, the gear 18 rotates at a reduced speed. The motor disclosed is more advantageous than known small-sized D.C. motors for the following reasons: With a portion of the deck 1 being utilized as a yoke, the motor is inexpensive to construct, flat in shape, and has an improved volumetric efficiency. The motor is light in weight. The motor can be assembled together with other parts added for playing back the magnetic tape, and hence is simple in overall construction. The armatures which are the most complicated parts to manufacture can be mass-produced and supplied by an expert manufacturer. The motor is small in size and flat in shape and fits into the recess 35 which, in practice, will have a diameter of about 35 mm and a depth of about 8 mm.

Control means for the motor will now be described with reference to FIGS. 3a and 3b, in which the motor is denoted by M.

Figure 3A:
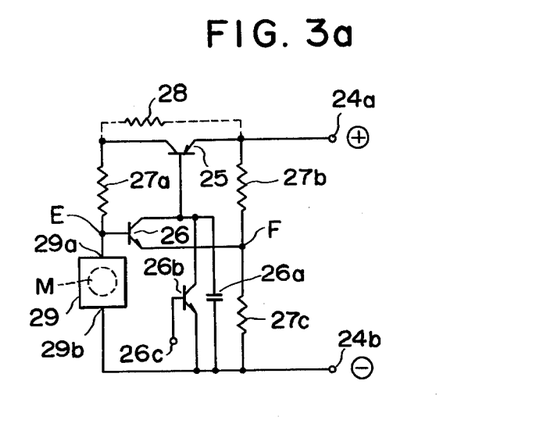
FIGS. 3a through 3c are circuit diagrams of a control circuit for a motor in the mode changeover apparatus.
Figure 3B:
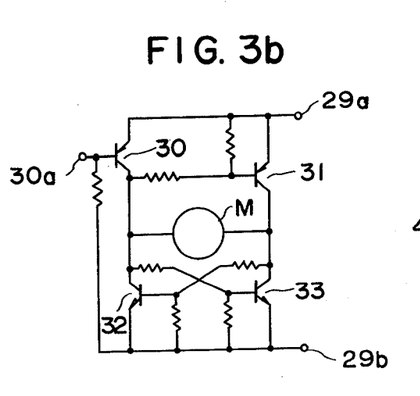

As shown in FIG. 3b, the control means comprises a pair of positive and negative terminals 29a, 29b, an inverter including transistors 30, 31, and a flip-flop including transistors 32, 33. When a terminal 30 is at the low level, the transistors 30, 33 are rendered conductive to energize the motor M in which a current flows rightward for regular rotation. As the terminal 30a goes high, the transistors 31, 32 are rendered conductive to cause a current to flow through the motor M leftward for reverse rotation. Designated at 24a, 24b in FIG. 3a are positive and negative terminals, respectively, of a power supply. When the motor M is ready for rotation with the terminal 30a in the low state, a capacitor 26a is charged to produce a base current for a transistor 25 which is then rendered conductive, whereupon the motor M is supplied with a current via a resistor 27a and starts rotating,. As the motor M reaches a predetermined rotational speed, the armature current is reduced to make the potential at a point E higher than that at a point F, thus rendering a transistor 26 conductive. After the capacitor 26a has been charged, the transistors 25, 26 remain conductive to allow the motor M to keep rotating.

As the load for the motor M is increased, the speed of rotation of the motor M and the back electromotive force thereof are reduced. Therefore, the potential at the point E becomes less than the potential at the point F, thereby rendering the transistor 26 and hence the transistor 25 nonconductive. The motor M is now de-energized.

The resistor 27a, the motor M and resistors 27b, 27c jointly constitute a bridge circuit. The speed of rotation of the motor M at which the latter is de-energized can be changed by changing the ratio in resistance between the resistors 27*b*, 27*c*.

After the motor M is thus de-energized under an excessive load, when the terminal 30*a* goes high and terminal 26*c* goes high temporarily, the motor M is ready for reverse rotation. The transistor 26*b* is conductive to allow the capacitor 26*a* to be discharged temporarily, thus rendering the transistors 25, 26 conductive. The motor M is now caused to rotate in a reverse direction. When the motor M is subjected to an excessive load, it is automatically de-energized in the manner described above.

Figure 2A:
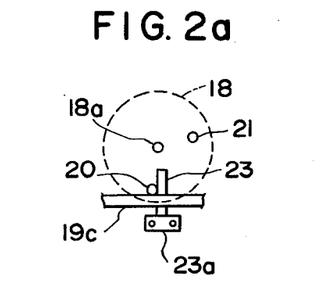
FIGS. 2a and 2b are fragmentary plan views of modified portions of mode changeover apparatus.

A driver device incorporating the gear 18 will be described together with the mechanism illustrated in FIG. 1. In FIG. 2*a*, the gear 18 has abutment pins 20, 21 projecting therefrom upwardly through an opening in the supported base 2 which is defind partly by bars 19*a*, 19*b* (FIG. 1).

When the terminal 30*a* is at the low level, the motor M is energized for regular rotation to rotate the gear 18 counterclockwise, causing the abutment pin 20 to be held against the bar 10*b* which enables the support base 2 to be displaced in a direction opposite to the direction of the arrow B. As the pin 20 engages projection 19 in the position illustrated in FIG. 1, the gear 18 and the motor M are prevented from rotating. Thus, the motor M is automatically de-energized. The magnetic head 4 is held in contact with the magnetic tape of a loaded cassette, and the pinch roller 7 is pressed against the capstan 6. The motor 13 is controlled to wind the magnetic tape forward with a small torque, and hence is in a playback mode. When the abutment pin 20 is at the dead point, the support base 2 is prevented from returning under the force of the spring 9*c*. If necessary, a resistor 28 may be added as shown in FIG. 3*a* to allow a small current to flow through the motor M for positional stabilization of the support base 2.

When the terminal 30*a* goes high and at the same time the terminal 26*c* goes high temporarily, the motor M starts rotating in the reverse direction as described above. The gear 18 is now caused to rotate clockwise, allowing the support base 2 to be retracted slightly. Then, the abutment pin 21 is brought into abutment against the bar 19*a*, whereupon the support base 2 is caused to advance. When the pin 21 abuts against the projection 19, the motor M is de-energized due to an excessive load. The distance between the pin 21 and the shaft 18*a* is about 2 mm smaller than that between the pin 20 and the shaft 18*a*. Thus, when the gear 18 is stopped in its dead point, the support base 2 is held in a position for cue and review modes of operation which is about 2 mm back off the position for playback mode of operation. When the motor 13 is rotated in a regular dirction (forward) at a high speed, the apparatus is in a cue mode of operation. Upon reversal of rotation of the motor M, the apparatus is in a review mode of operation. At this time, the lever 8 is held against a pin 8*b* to keep the pinch roller 7 spaced from the capstan 6. When the terminal 30*a* goes low with the terminal 26*c* again at the high level temporarily, the transistor 26*b* is rendered conductive to allow the capacitor 26*a* to be discharged, whereupon the motor M is rotated in the regular direction for the playback mode of operation.

Figure 3C:
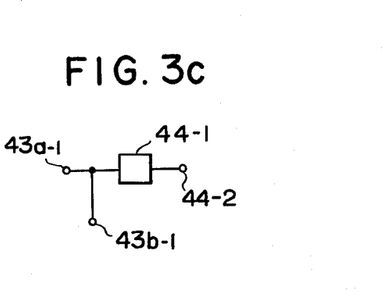

Means for switching the apparatus into a stop mode of operation will be described. FIG. 3*c* is an electric circuit diagram of a circuit for controlling such means.

When a push button for a stop mode is depressed, an electric signal is supplied via a terminal 42-1 to a monostable circuit 44-1 which generates at output terminals 42*a*-1, 43*b*-1 high-level signals which continue for a predetermined interval of time. The output at the terminal 43*b*-1 is applied to the terminal 26*c* (FIG. 3*a*) and the output at the terminal 43*a*-1 is applied to the terminal 30*a* (FIG. 3*b*). Thus, the motor M is caused to rotate temporarily in the reverse direction. Since the terminal 30*a* goes low immediately, the transistors 30, 33 are rendered conductive to cause an excessive armature current to flow, permitting the potential at the point E (FIG. 3*a*) to drop, whereupon the transistor 26 and hence the transistor 24 are rendered nonconductive to de-energize the motor M. As the pin 20 has already been shifted out of its dead point, the support base 2 is retracted under the resiliency of the spring 9*c* until the pins 20, 21 are held respectively against the bars 19*a*, 19*b*, or one end of the guide slots 3*a*, 3*b*, 3*c* engage the guide pins 2*a*, 2*b*, 2*c*, respectively. When the support base 2 is in such a retracted position, the apparatus is in a stop mode of operation. During such operation, the motor M is caused to rotate under the force of the spring 9*c* and hence serves as a mechanical governor to prevent impact sounds from being produced. Simultaneously, the motor 13, an amplifier circuit for the magnetic head 4, and a motor for the capstan 6 are de-energized in a conventional manner. A known means is incorporated to bring the apparatus into fast feed and rewind modes of operation by rotating the motor 13 in regular and reverse directions, respectively, while the deck is in such a stop mode position.

As can be understood from the foregoing, for a playback mode of operation, a playback push-button is depressed to cause the terminal 30*a* (FIG. 3*b*) to go low and the motor 13 is caused to rotate in a regular direction with a small torque. For cue and review modes of operation, a fast feed or rewind push-button is depressed to apply a high-level input to the terminal 30*a* and also a high-level input temporarily to the terminal 26*c*. When the motor 13 is rotated at a high speed in a regular direction at this time, the apparatus is in a cue mode of operation. Conversely, reversal of rotation of the motor 13 puts the apparatus in a review mode of operation.

When a stop push-button is depressed, the apparatus is brought into a stop mode of operation as described above. At this time, depression of the fast feed push-button switches the apparatus into a fast feed mode of operation, and depression of the rewind push-button switches the apparatus into a rewind mode of operation. During such operations, the support base 2 should be prevented from being displaced. To this end, the terminals 30*a*, 26*c* are prevented from being energized by an electric switch 41 (FIG. 1) which engages the support base 2 as it is in the position corresponding to the stop mode of operation.

The electric current through the motor M which is required to move the support base 2 is about 100 mA which is about one twentieth of the current necessary for actuating conventional solenoid-operated plungers. The motor M produces no impact sound and is small in size, lightweight, and flat in shape.

The gear 18 has a radially outward-extending cam 22*a* (FIG. 1) which is advantageous for the reasons which follow:

When the apparatus is changed from the cue or fast feed mode to the playback mode, the magnetic tape is pinched between the capstan 6 and the pinch roller 7 and tends to get damaged under an increased tension applied, or to slacken around the reel 10a, resulting in the risk of malfunctioning of the magnetic recorder/player. When the apparatus is changed from the review mode to the playback mode, the magnetic tape is liable to loosen due to inertia of the take-up reel 10, and to slacken around the reel 10, resulting also in the possibility of malfunctioning of the magnetic recorder/player. To overcome such a difficulty, it is necessary to brake both of the reels 10, 10a when the foregoing mode changeover is effected. Such braking has conventionally been carried out by solenoid-operated plungers. The apparatus according to the present invention effects each braking as follows:

During cue and review modes in which the pin 21 abuts against the projection 19, the cam 22a on the periphery of the gear 18 is located in the position shown by the broken line in FIG. 1. When mode changeover is effected for the playback mode, the gear 18 is caused to rotate counterclockwise, bringing the cam 22a into sliding engagement with the end 15c of the lever 15. The cam 22a has an inclined surface which causes the end 15c to be lifted and then lowered before the cam 22a is moved out of engagement with the end 15c. Thus, during mode changeover from the cue mode to the playback mode, the lever 15 is pivoted up and down to enable the braking end 15b to engage the ratchet teeth 12a, whereupon the reel 10a is braked against rotation. During mode changeover from the review mode to the playback mode, the braking end 15a of the lever 15 is caused to engage the ratchet teeth 12, thereby braking the reel 10 against rotation. Thereafter, the support base 2 is shifted to the position corresponding to the playback mode, thus causing the pinch roller 7 and the capstan 6 to sandwich the magnetic tape. The magnetic tape is therefore prevented from being damaged or entangled due to the tape's being slackened. While the foregoing braking is also performed during mode changeover from the playback mode to the stop, cue or review mode, such braking may not necessarily be effected.

For music selection operation, it is necessary to detect a no-signal zone between music pieces on the magnetic tape during the cue or review mode, and then to select the playback mode immediately. With the illustrated arrangement, the reels 10, 10a are temporarily stopped by the lever 15 in the meantime, and hence there is no possibility for the tape to move toward the beginning end of the next music piece resulting in incorrect music selection.

Figure 2B:
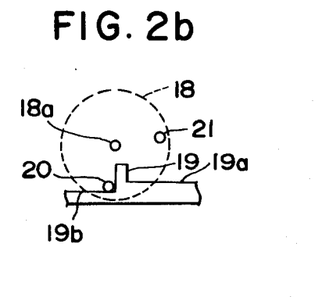

The gear 18 shown in FIG. 1 may be modified as shown in FIGS. 2a and 2b. Identical parts in FIGS. 2a, 2b are denoted by identical reference characters in FIG. 1. An abutment member 23 illustrated in FIG. 2a corresponds to the projection 19 shown in FIG. 1, and has an end 23a secured to the deck 1. When the abutment pin 20 is held against the member 23 as shown in FIG. 2a, the support base 2 is held in the position for the playback mode. As the gear 18 rotates clockwise to bring the pin 21 into engagement with the abutment member 23, the support base 2 is held in the position for the cue or review mode. Thus, operation and advantages of the gear 18 shown in FIG. 2a are the same as those of the gear 18 shown in FIG. 1. A member 19c corresponds to the bars 19a, 19b illustrated in FIG. 1. In FIG. 2b, the support base 2 includes bars 19a, 19b with which the abutment pins 20, 21 are engageable, the bars 19a, 19b being stepped with a difference in width being of about 2 mm. In the illustrated position, the support base 2 is held in place for the playback mode. As the gear 18 rotates clockwise, the pin 21 is moved into engagement with the bar 19a and the projection 19 to position the support base 2 for the cue or review mode. The abutment pins 20, 21 are equidistant from the shaft 18a. The arrangement shown in FIG. 2b has the same advantages as those of the structure illustrated in FIG. 2a.

In the embodiment of FIG. 2a, the bar 19c may be dispensed with, and the gear 18 upon rotation may actuates a crank lever to displace the support base 2, an arrangement which is advantageous as well. While the bars 19a, 19b constitute a part of the support base 2, a separate bar may be provided which can be moved by one of the pins 20, 21 to displace the support base 2, in which case the gear 18 is required to rotate through approximately 360 degrees.

With the projection 19 being increased in width, the abutment pins 20, 21 as they abut against the sides of the projection 19 become displaced out of the dead points thereof. However, the support base 2 can be fixed in the positions for the playback, cue and review modes by reducing the resistance of the resistor 28 (FIG. 3) to allow an increased current to flow therethrough. With this arrangement, de-energization of the motor M allows the support base 2 to be retracted to the stop mode position under the resiliency of the spring 9c. Thus, the control circuit shown in FIG. 3c may be dispensed with.

The control circuits illustrated in FIGS. 3a through 3c may be replaced with mechanical switches and changeover switches. More specifically, the circuit of FIG. 3b may be replaced with a known switch for switching between regular and reverse rotations of the motor M. The circuit shown in FIG. 3a may be replaced with two parallel-connected switches for controlling energization and de-energization of the motor M, one of the switches comprising a normally open switch which will be closed only when the abutment pins 20, 21 (FIG. 1) engage the projection 19, and the other switch allowing, upon being closed, the motor M to rotate the gear 18 until the normally closed switch which has temporarily been opened by the pins 20, 21 is closed. These switches can be controlled by mode selection push-buttons to effect various kinds of mode changeover.

Figure 6:
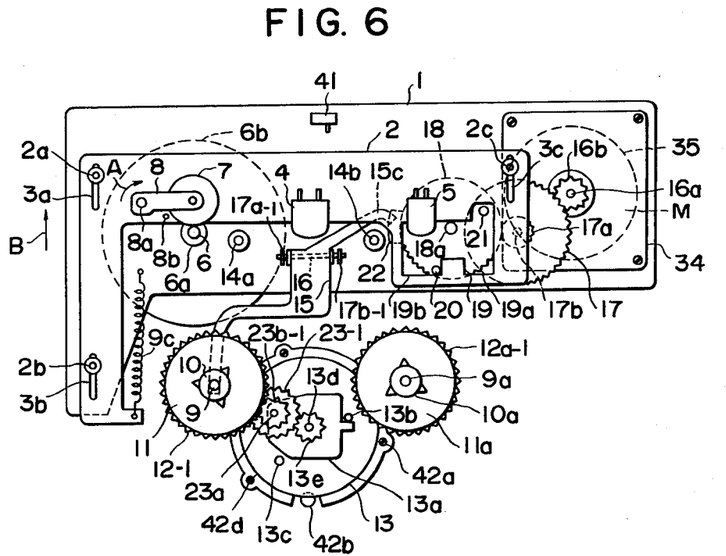
FIG. 6 is a plan view of a mode changeover apparatus according to another embodiment.

FIG. 6 illustrates a mode changeover apparatus according to another embodiment of the present invention. Like or corresponding parts are indicated by like or corresponding reference characters throughout FIGS. 1 through 4c and FIG. 6.

Figure 7A:
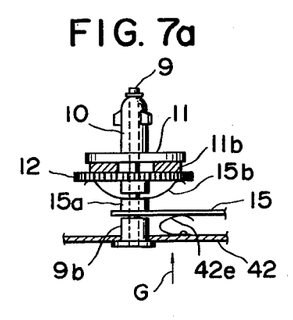
FIGS. 7a and 7b are side elevational views of reels.
Figure 7B:
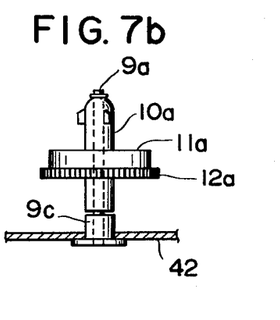

A pair of reels 10, 10a are rotatably supported respectively on shaft 9, 9a projecting from the body of a magnetic recorder/player and are integral with reel bases 11, 11a, respectively, molded of plastic material. As best shown in FIG. 7, the reel bases 11, 11a have therebeneath a pair of gears 12-1, 12a-1, respectively. Means for driving the reels 10, 10a of FIG. 6 will be described in detail later on. The parts as shown are in the position for the playback mode since the magnetic tape is fed leftward by a pinch roller 7 and a capstan 6 and wound around a cassette hub on a take-up reel 10. The reels 10, 10a will be called "take-up reel" and "supply reel", respectively.

A lever 15 is supported for up and down angular movement on a pivot pin 16 journalled in a pair of bearings 17a-1, 17b-1. Operation of the lever 15 will later be described with reference to FIG. 7a. in FIG. 7a, a shaft 9 extends upwardly from a sleeve 9b fixed to the bottom 42 of the body of the magnetic recorder/player. The reel 10 and reel base 11 are rotatably supported on the shaft 9, there being an annular piece of felt 11b bonded to the underside of the reel base 11. The gear 12-1 is rotatably supported on the shaft 9. The lever 15 has, at its lefthand end (FIG. 6), a sleeve 15a loosely disposed around the shaft 9. A leaf spring 15b is centrally mounted on the sleeve 15a and normally urges the gear 12-1 toward the reel base 11 with the felt piece 11b interposed therebetween so that the reel base 11 and the gear 12-1 are frictionally slidably coupled with each other. A leaf spring 42e normally urges the gear 12-1 in the direction of the arrow G. The sleeve 15a is displaced in a direction opposite to the direction of the arrow G against the resiliency of the leaf spring 40e.

When the lever 15 is raised in the direction of the arrow G, the sleeve 15a is pressed directly against a lower end of the gear 12-1 to thereby increase a frictional force with which the reel base 11 and the gear 12-1 are frictionally coupled.

As illustrated in FIG. 7b, the shaft 9a extends upwardly from a sleeve 9c secured to the bottom 42. The reel base 11a and the gear 12a-1 are integral with each other and rotatably supported on the shaft 9a.

The mechanism shown in FIG. 6 and a drive device incorporating the gear 18 operate in the same manner as the embodiment shown in FIGS. 1 through 4c.

Figure 5:
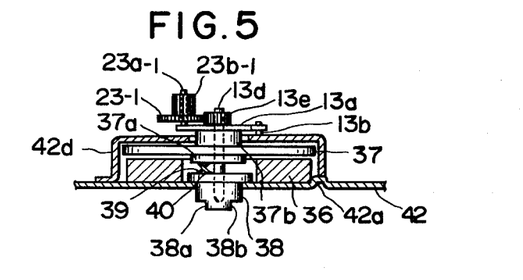
FIG. 5 is a cross-sectional view of the motor.

A mechanism for driving the reel 10 and a motor 13 for actuating the mechanism will now be described. As best shown in FIG. 5, the motor 13 comprises a bearing 38 fitted in a hole in the bottom 42 which comprises a plate of mild steel, and brushes 39, 40 and recesses 38a, 38b in the bearing 38 which are the same in construction and operation as those shown in FIG. 4a.

An annular field magnet 36 is secured to the bottom 42. The bottom 42 has three protuberances 42a angularly spaced 120 degrees from each other to locate the field magnet 36 in position. One of such protuberances is shown in FIG. 6 at 42b. The field magnet 36 is of the same construction as that of the field magnet illustrated in FIG. 4a.

An inverted cup-shaped member 42d formed by pressing of mild steel has a peripheral edge screwed to the bottom 42 and serves as a magnetic path for the field magnet 36. The cup-shaped member 42d has a central hole through which upwardly project a rotative shaft 13d and a cylindrical member 37b which is integral with an armature 37. A lever 13a is loosely fitted around the rotative shaft 13d, and is placed horizontally on an upper surface of the cylindrical member 37b. The rotative shaft 13d has on its upper end a small-sized gear 13e fixed thereto.

A shaft 23a-1 projects upwardly from the lever 13a and rotatably supports gears 23-1, 23b-1 integrally molded of plastic material, the gear 23-1 being held in mesh with the gear 13e.

With such an arrangement, the motor 13 shown in FIG. 6 will operate in the same manner as the motor illustrated in FIG. 4a.

While the motor of FIG. 4a for driving the support base 2 is housed in a depression in deck 1, the motor illustrated in FIG. 6 is mounted on the bottom 42, a structure which is suitable for a magnetic recorder/player specially designed for cassette tapes.

The reels 10, 10a will be driven as follows: Although not shown, the motor 13 is controlled by a control circuit which is the same as shown in FIG. 3b. Thus, the motor will rotate in a regular direction when the input terminal of the control circuit is at the low level, and will rotate in a reverse direction as the input terminal goes high.

When the motor 13 rotates in a regular direction to cause the shaft 13d to rotate counterclockwise, a lever 13a rotates also in the counterclockwise direction to bring the gear 23b-1 into mesh with the gear 12-1. The lever 13a is prevented from being rotated counterclockwise by a pin 13b on an upper surface of the motor 13, whereupon the gear 23b-1 drives the gear 12-1 counterclockwise.

In the playback mode of operation, the gear 18 has angularly moved counterclockwise and stopped by the pin 20 held against the projection 19. The righthand end 15c of the lever 15 slidably engages the inclined surface of the cam 22 on the peripheral edge of the gear 18, and is lifted upwardly (toward the viewer of FIG. 6). Thus, the sleeve 15a on the lefthand end of the lever 15 is lowered as shown in FIG. 7a. The reel base 11 rotates counterclockwise to wind the magnetic tape around a hub of a loaded cassette. The reel base 11 slides with respect to the gear 12-1 with the felt 11b interposed therebetween since the magnetic tape travels at a speed limited by the capstan 6 and the pinch roller 7. Only a small power output is required of motor 13 since the torque necessary to wind the magnetic tape is small. Due to slippage between the reel base 11 and the gear 12-1, ripples in the torque of the motor 13 and flutters which the gears 13e, 23-1, 23b-1 produce can be eliminated.

The foregoing parts position is for the playback or recording mode of operation. Since the motor M is given a torque for regular rotation by a small current (generally, about 50 mA) flowing through the resistor 28 (FIG. 3a), the pin 20 shown in FIG. 6 is pressed against the projection 19 to maintain the apparatus in the playback mode of operation. When the power supply is cut off or the plug is inadvertently pulled out of the receptacle, the current flowing through the resistor 28 is cut off to allow the support base 2 of FIG. 6 to spring back under the resiliency of the spring 9, thus bringing the apparatus into a stop mode of operation. At this time, the motor M is caused to rotate in a reverse direction by the gears, and hence serves as a mechanical governor which permits the apparatus to be quietly shifted to the position for the stop mode of operation. Since the motor M is coreless, the motor M is subjected to no cogging. Thus, smooth governor action can be performed, and the force of the spring 9 may be weak. The motor M requires about 100 mA for its regular rotation and about 50 mA when it is stopped, and is small in size, lightweight, and is less expensive and consumes less electric power than known solenoid-operated plungers.

While in the foregoing embodiment the cam 22 is employed to pivot the lever 15 for the playback mode of operation, a lever may be provided which can be displaced by the abutment pin 20 to pivot the lever 15.

When the terminal 30a shown in FIG. 3b goes high and at the same time the terminal 26c of FIG. 3a temporarily goes high, the motor M rotates in a reverse direction to rotate the gear 18 clockwise, causing the support base 2 to be backed off slightly. As the pin 21 abuts against the bar 19a, the support base 2 advances. When the pin 21 is held against the projection 19, the load for the motor M increases to de-energize the motor M. Since the distance between the pin 21 and the shaft 18a is smaller about 2 mm than the distance between the pin 20 and the shaft 18a, the support base 2 is brought into the cue to review mode position which is spaced about 2 mm rearwardly from the playback mode position. The support base 2 is kept in the cue or review position by the motor M which remains energized by a small current flowing through the resistor 28 (FIG. 3a).

When the power output of the motor 13 is increased at this time in a conventional manner, the reel 10 is caused to rotate at a high speed for a cue mode of operation. With the end 15c of the lever 15 being out of engagement with the cam 22, the lever 15 is raised in the direction of the arrow G (FIG. 7a) under the resiliency of the leaf spring 42e. The sleeve 15a is now directly pressed against the gear 12-1, thus increasing the frictional force with which the reel base 11 and the gear 12-1 are coupled together. The reel 10 can therefore be driven under a large torque without undergoing slippage. With the projection 19 increased widthwise, the gear 18, when at a dead point, keeps the support base 2 in the playback mode position. When the power supply is cut off, therefore the support base 2 does not return to the stop mode position. It is necessary to rotate the motor M in a reverse direction to bring the support base 2 into the stop mode position. However, the arrangement is advantageous in that the motor M is not required to be energized during the review or cue mode of operation. When the terminal 30a goes low and the terminal 26c temporarily goes high again, the transistor 26b is rendered conductive to discharge the capacitor 26a, whereupon the motor M rotates in the regular direction to bring the support base 2 back into the playback mode position.

When the terminal 30a is at the high level and the input of the control circuit for the motor 13 is also at the high level, the support base 2 is moved to the review mode position. The motor 13 of FIG. 6 rotates clockwise to cause the lever 13a to rotate clockwise, enabling the gear 23b-1 to mesh with and drive the gear 12a-1 in the clockwise direction. At this time, the lever 13a is held against a pin 13c on the upper surface of the motor 13.

When the power supply switch is turned off, the support base 2 springs back under the resiliency of the spring 9 during which time the motor M serves as a mechanical governor. As the support base 2 abuts against the pins 20, 21 simultaneously, the support base 2 is in a stop mode position. When the motor 13 is energized for regular rotation, the magnetic tape is fed at a fast rate, and upon reversal of rotation, the magnetic tape is rewound.

As can be understood from the foregoing, for a playback mode of operation, a playback push-button is depressed to cause the terminal 30a (FIG. 3b) to go low and the motor 13 is caused to rotate forward with a small torque. For cue and review modes of operation, a fast feed or rewind push-button is depressed to apply a high-level input to the terminal 30a and also a high-level input temporarily to the terminal 26c. When the motor 13 is rotated forward at a high speed at this time, the apparatus is in a cue mode of operation. Conversely, reverse rotation of the motor 13 puts the apparatus in a review mode of operation.

When a stop push-button is depressed, the power supply is cut off and the apparatus is brought into a stop mode of operation. At this time, depression of the fast feed push-button switches the apparatus into a fast feed mode of operation, and depression of the rewind push-button switches the apparatus into a rewind mode of operation. During such operations, the support base 2 should be prevented from being displaced. To this end, the terminals 30a, 26c are de-energized by an electric switch 41 (FIG. 1) which is engaged by the support base in the position corresponding to the stop mode of operation.

The electric current through the motor M which is required to move the support base 2 is about 100 mA which is about one twentieth of the current necessary for actuating conventional solenoid-operated plungers. The motor M produces no impact sounds and is small in size, lightweight, and flat in shape. The gear 23b of FIG. 1 may be a rotatable body, and the gears 12, 12a may comprise rotatable bodies having rubber rings around peripheries thereof.

The control circuits illustrated in FIGS. 3a through 3c may be replaced with mechanical switches and changeover switches. More specifically, the circuit of FIG. 3b may be replaced with a known switch for switching between regular and reverse rotations of the motor M. The circuit shown in FIG. 3a may be replaced with two parallel-connected switches for controlling energization and de-energization of the motor M, one of the switches comprising a normally open switch which will be closed only when the abutment pins 20, 21 (FIG. 1) engage the projection 19, and the other switch allowing, upon being closed, the motor M to rotate the gear 18 until the normally closed switch, which has temporarily been opened by the pins 20, 21, is closed. These switches can be controlled by mode selection push-buttons to effect various kinds of mode changeover.

Thus, there is provided in accordance with the invention a mode changeover apparatus for a magnetic recorder/player which has the advantages discussed above. The embodiments described are intended to be merely exemplary and those skilled in the art will be able to make variations and modifications in them without departing from the spirit and scope of the invention. All such modifications and variations are contemplated as falling within the scope of the claims.

What is claimed is:

1. A mode changeover apparatus for a magnetic tape recorder/player, comprising:
    a deck;
    a support base carrying at least one magnetic head and secured to said deck by means for allowing reciprocating movement of said support base relative to said deck between playback and stop positions;
    a motor mounted on said deck;
    means for biasing said support base toward said stop position and moving said support base to said stop position responsive to the stopping of said motor;
    means, responsive to rotation of the motor in a first direction, for moving said support base to said playback position; and
    means, responsive to rotation of the motor in the opposite direction, for moving said support base to a cue and review position intermediate said playback and stop positions.

2. A mode changeover apparatus for a magnetic tape recorder/player comprising:
    a deck;
    a support base carrying at least one magnetic head and secured to said deck by means for allowing reciprocating movement of said support base relative to said deck between playback and stop positions;

a first motor mounted on said deck;
means for biasing said support base toward said stop position and moving said support base to said stop position responsive to the stopping of said motor;
rotatable wheel means mounted on said deck and driven by said motor;
first abutment means, carried by said rotatable wheel means, for engaging and pushing said support base to said playback position against the resiliency of said biasing means, as said wheel is rotated in one direction; and
second abutment means, carried by said rotatable wheel means, for engaging and holding said support base in a cue and review position, intermediate said playback and stop positions, as said wheel is rotated in the opposite direction.

3. The mode changeover apparatus of claim 2 further comprising:
stop means on said support base for engaging one of said first and second abutment means and stopping rotation of said wheel means; and
means for de-energizing said first motor responsive to the engagement of said stop means by one of said abutment means.

4. The mode changeover apparatus of claim 2 wherein:
said wheel means is a single wheel and said first and second abutment means are protrusions on said wheel.

5. The mode changeover apparatus of claim 4 wherein:
said protrusions are carried on a single surface of said single wheel and are received in an opening in said support base.

6. The mode changeover apparatus of claim 2 further comprising:
supply reel and take-up reel stands rotatably mounted on said deck;
a second motor mounted on said deck for alternately driving said reel stands;
braking means for engaging and stopping rotation of said reel stands;
a cam carried by said wheel means for engaging and operating said braking means during rotation of said wheel means between playback and cue and review positions.

7. The mode changeover apparatus of claim 6 wherein rachet teeth are provided around the peripheries of said take-up and supply reel stands and wherein said braking means includes a lever pivotally mounted on said deck, one end of said lever engaging said cam and the other end of said lever engaging said rachet teeth.

8. A mode changeover apparatus for a magnetic tape recorder/player, comprising:
a deck in the form of a steel plate having a cylindrical recess;
a bearing and a shaft rotatably supported by said bearing, mounted in the bottom of said recess;
an annular field magnet secured within said recess;
a steel plate covering said recess and serving to form a magnetic path in conjunction with said field magnet;
a disk-shaped armature secured to an intermediate portion of said shaft;
brushes and a commutator mounted within said recess for supplying an electric current to said armature thereby generating a driving torque;
a wheel mounted on the end of said shaft opposite said bearing;
a support base carrying at least one magnetic head and secured to said deck by means for allowing reciprocating movement of said support base relative to said deck between playback and stop positions;
means for biasing said support base toward said stop position;
means responsive to rotation of said wheel for moving said support base, against said biasing means, to said playback position; and
means responsive to reverse rotation of said first wheel for bringing said support base to a cue or review position intermediate said playback and stop positions.

9. A mode changeover apparatus for a magnetic tape recorder/player, comprising:
a deck;
a support base carrying at least one magnetic head and secured to said deck by means for allowing reciprocating movement of said support base relative to said deck between playback and stop positions;
a first motor mounted on said deck;
means for biasing said support base toward said stop position and moving said support base to said stop position responsive to rotation of said motor under the control of an electric stop command signal;
support base positioning means for moving said support base to said playback position responsive to rotation of the motor in a first direction and for moving said support base to a cue and review position intermediate said playback and stop positions responsive to rotation of the motor in the opposite direction;
supply reel and take-up reel stands rotatably mounted on said deck;
a reel stand drive motor mounted on said deck;
a frictional coupling for engaging said take-up reel stand and for transmitting torque from said reel drive motor to said take-up reel stand with slippage in the playback mode; and
means for increasing the frictional force of said coupling against said take-up reel stand when said support base is moved out of said playback position so that said take-up reel stand is driven without slippage.

10. The mode changeover apparatus of claim 9 wherein:
said support base positioning means comprises a rotatable wheel carrying a camming member or surface;
said take-up reel stand is rotatably mounted on a shaft secured to said deck;
said frictional coupling includes a rotatable body, rotatably supported on said shaft and driven by said reel drive motor, and a resilient member interposed between said rotatable body and said take-up reel stand; and
said frictional force increasing means comprises a lever pivotally mounted on said deck, a first end of said lever being biased to bear against said rotatable member and the other end of said lever engaging said camming member or surface only in the playback mode to cause said lever to pivot to a position where said first end of said lever does not bear against said rotatable body.

11. The mode changeover apparatus of claim 10 further comprising a spring member for pressing said rotatable body against said take-up reel stand through said resilient member during all modes of operation.

12. A mode changeover apparatus for a magnetic tape recorder/player, comprising:
 a housing;
 a deck, mounted within said housing, in the form of a plate of a mild steel having a cylindrical recess;
 a bearing and a first shaft, rotataby supported by said bearing, mounted in the bottom of said recess;
 a first annular field magnet secured within the recess surrounding said first shaft and having a plurality of north and south poles spaced at equal pitches;
 a steel plate covering said recess and serving to form a magnetic path in conjunction with said field magnet;
 a first disk-shaped armature secured to said shaft and located within the magnetic field created by said first magnet;
 brushes and a commutator mounted within said recess for supplying an electric current to said armature thereby generating a driving torque in said first armature;
 a first wheel mounted on the end of said shaft opposite said bearing;
 a support base carrying at least one magnetic head and secured to said deck by means allowing reciprocating movement of said support base relative to said deck between playback and stop positions;
 means for biasing said support base toward said stop position and moving said support base to said stop position responsive to the stopping of said motor;
 a second wheel rotatably mounted on said deck, rotatable responsive to rotation of said first wheel;
 first abutment means, carried by said second wheel, for engaging and pushing said support base to said playback position, against the resiliency of said biasing means, as said second wheel is rotated in one direction;
 second abutment means, carried by said second wheel, for engaging and holding said support base in a cue and review position, intermediate said playback and stop positions, as said second wheel is rotated in the opposite direction;
 take-up and supply reel stands rotatably mounted within said housing;
 a second bearing, secured to said housing, and a second shaft, rotatably supported by said second bearing;
 a second annular field magnet surrounding said second shaft;
 a cup-shaped steel cover over said second field magnet and serving as a magnetic path therefor, said cover having a hole through which said second shaft extends;
 a second disk-shaped armature fixed to said second shaft, within the magnetic field of said second annular field magnet;
 a second commutator and brushes held in sliding contact therewith for supplying an electric current to said second armature thereby generating a driving torque in said second armature;
 a third wheel mounted on the end of said second shaft opposite said second bearing;
 a lever mounted on said second shaft;
 a fourth wheel mounted on said lever in engagement with said third wheel, said lever being rotatable with said second armature in one direction for bringing said fourth wheel into engagement with said supply reel stand and driving same and rotatable with said second armature in the opposite direction for bringing said fourth wheel into engagement with said take-up reel stand and driving same.

* * * * *

UNITED STATES PATENT AND TRADEMARK OFFICE
CERTIFICATE OF CORRECTION

PATENT NO. : 4,460,933
DATED : July 17, 1984
INVENTOR(S) : Itsuki BAN

It is certified that error appears in the above—identified patent and that said Letters Patent is hereby corrected as shown below:

```
Column 3, line 9, "rotaes" should read --rotates--;
          line 17, "fact" should read --face--;
          line 48, "hereafter" should read --hereinafter--; and
          line 62, "52-36507" should read --51-36507--.
Column 4, line 10, "magnetic" should read --magnet--; and
          line 39, "a" should read --the-- and "30" should
                   read --30a--.
Column 5, line 13, "driver" should read --drive--;
          line 17, "supported" should read --support-- and
                   "defind" should read --defined--;
          line 22, "10b" should read --19b--; and
          line 54, "dirction" should read --direction--.
Column 6, line 2 "42a-1" should read --43a-1--; and
          line 12 "24" should read --25--.
Column 8, line 66 "in" should read --In--.
Column 9, line 14 "40e" should read --42e--.
Column 11, line 1 "to" should read --or--.
Column 12, line 3, after "base" insert --2--.
```

Signed and Sealed this

Seventh Day of May 1985

[SEAL]

Attest:

DONALD J. QUIGG

Attesting Officer   Acting Commissioner of Patents and Trademarks